US009919879B2

(12) United States Patent
Kuijpers et al.

(10) Patent No.: US 9,919,879 B2
(45) Date of Patent: Mar. 20, 2018

(54) SORTING DEVICE

(71) Applicant: OPTIMUS SORTER HOLDING BV, Wijchen (NL)

(72) Inventors: Don Johan Ben Koenraad Kuijpers, Wijchen (NL); Maurice Gert-Willem Koop, Wijchen (NL)

(73) Assignee: OPTIMUS SORTER HOLDING BV, Wijchen (NL)

( * ) Notice: Subject to any disclaimer, the term of this patent is extended or adjusted under 35 U.S.C. 154(b) by 0 days.

(21) Appl. No.: 15/311,306

(22) PCT Filed: May 13, 2015

(86) PCT No.: PCT/NL2015/050345
§ 371 (c)(1),
(2) Date: Nov. 15, 2016

(87) PCT Pub. No.: WO2015/174843
PCT Pub. Date: Nov. 19, 2015

(65) Prior Publication Data
US 2017/0073172 A1     Mar. 16, 2017

(30) Foreign Application Priority Data

May 15, 2014   (NL) .................................. 2012822

(51) Int. Cl.
*B65G 47/10*     (2006.01)
*B65G 47/84*     (2006.01)
*B65G 17/06*     (2006.01)

(52) U.S. Cl.
CPC ......... *B65G 47/844* (2013.01); *B65G 17/065* (2013.01)

(58) Field of Classification Search
CPC .. B65G 47/841; B65G 47/844; B65G 17/065; B65G 17/14; B65G 17/12
USPC .......................... 198/890, 890.1, 370.02, 793
See application file for complete search history.

(56) References Cited

U.S. PATENT DOCUMENTS

| 6,283,271 | B1 | 9/2001 | Van Den Goor |
| 8,297,430 | B2 | 10/2012 | Van Den Goor et al. |
| 8,602,202 | B2 | 12/2013 | Van Den Goor et al. |
| 9,242,806 | B2* | 1/2016 | Hopman ............... B65B 35/205 |

(Continued)

FOREIGN PATENT DOCUMENTS

| EP | 1972579 A1 | 9/2008 |
| WO | WO-2008/094033 A1 | 8/2008 |

OTHER PUBLICATIONS

International Search Report and Written Opinion of the ISA for PCT/NL2015/050345, ISA/EP, Rijswijk, NL, dated Sep. 3, 2015.

*Primary Examiner* — William R Harp
(74) *Attorney, Agent, or Firm* — Harness, Dickey & Pierce, P.L.C.

(57) ABSTRACT

A sorting device comprising an endless path placed on a frame, a series of trays provided with a pusher mechanism to be driven by an exchange system placed on the frame for pushing away an object substantially transverse to the conveyance direction, a drive system comprising alternately arranged first and second driving elements that are mutually connected to each other so as to hinge for a movement of the drive system that is oriented substantially parallel to the conveyance direction, a drive adapted for transferring a drive power onto the drive system, which power is directed substantially parallel to the conveyance direction.

8 Claims, 5 Drawing Sheets

(56) References Cited

U.S. PATENT DOCUMENTS

| 9,573,773 B2* | 2/2017 | Otto .................... B65G 47/844 |
| 2010/0059333 A1 | 3/2010 | Van Den Goor et al. |
| 2013/0001043 A1 | 1/2013 | Van Den Goor et al. |

* cited by examiner

US 9,919,879 B2

SORTING DEVICE

CROSS-REFERENCE TO RELATED APPLICATIONS

This application is a 371 U.S. National Stage of International Application No. PCT/N:2015/050345, filed May 13, 2015, which claims the benefit of and priority to Netherlands Patent Application No. 2012822, filed May 15, 2014. The disclosures of the above applications are incorporated herein by reference.

FIELD OF THE INVENTION

The invention relates to a sorting device comprising:
an endless path placed on a frame,
a series of trays provided with a pusher arm to be driven by means of an exchange system placed on the frame for pushing away an object substantially transverse to the conveyance direction,
a drive system comprising alternately arranged first and second driving elements that are mutually connected to each other so as to hinge for a movement of the drive system that is directed substantially parallel to the conveyance direction,
a drive adapted for transferring a drive power onto the drive system, which power is directed substantially parallel to the conveyance direction.

Such a sorting device is known in the art, wherein a path is formed, extending substantially in the horizontal plane, wherein the trays are conveyed in a substantially horizontal plane. The trays are usually designed as carriers having a substantially rectangular shape, which carriers are provided with a positioning surface on which an object to be conveyed and sorted can be placed. To each tray a pusher mechanism is attached suitable for pushing away an object laterally relative to the conveyance direction, the object in this application weighing roughly between 0.1 kg and 50 kg. As such it is the intention of such a sorting device to sort packages, such as cardboard boxes, plastic boxes and containers, goods wrapped in foil, such as goods made of paper, for example magazines, and such as clothing. It will be advantageous in such cases to manufacture the trays with a linear measure of at least 200 mm, preferably up to 600 mm, extending parallel to the conveyance direction, and with a breadth of at least 300 mm, preferably up to for instance 800 mm, extending transverse to the conveyance direction.

Such sorting devices have the disadvantage of taking up a large volume of for instance a working space, wherein particularly the dimensions of the sorting device equipped with pusher arms attached to the trays are large in horizontal direction and/or are too large to place the sorting device in the working space available.

It is an object of the invention to provide a sorting device equipped with pusher arms attached to the trays, which does not have this disadvantage and which is nevertheless suitable for conveying and sorting objects such as described above.

BACKGROUND OF THE INVENTION

This objective is achieved by a sorting device comprising:
a frame,
an endless path formed by a first and second endless guide arranged on the frame, wherein the second guide is placed substantially parallel to and spaced apart from the first guide,
a series of trays each having a positioning surface for carrying an object to be conveyed and sorted, wherein each tray is arranged so as to be movable in a conveyance direction via the first and second guide along the path, wherein the trays are provided with a pusher mechanism for pushing away an object substantially transverse to the conveyance direction, wherein the pusher mechanism is operable via an engagement member attached to the tray,
an exchange system arranged on the frame, which exchange system comprises an operation member that, when operated, engages the engagement member attached to the tray for driving the pusher mechanism,
a drive system which substantially parallel to and spaced apart from the path forms a closed loop assembled from alternately arranged first and second driving elements, that are mutually hinged to each other for a movement of the drive system that is directed substantially parallel to the conveyance direction, wherein the drive system is placed laterally relative to and on one side of the intermediate space extending between the first and second guide,
a drive adapted for transferring a drive power onto the drive system, which power is directed substantially parallel to the conveyance direction,
wherein the trays are connected to the drive system, such that each tray is coupled to one of the first driving elements,
wherein the first guide extends in a first substantially vertical plane and the second guide extends in a second substantially vertical plane, such that the path has a first track in which the trays can be conveyed substantially horizontally for conveying an object, and the path has a second track that extends substantially underneath the first track,
wherein each first driving element is coupled to a second driving element so as to hinge to such an extent that the centre line of a joint hinge pin of the first and the second driving element extends substantially transverse to the conveyance direction and runs substantially parallel to the positioning surface of the tray. In that way, considered in horizontal direction, it becomes possible to limit the size of the sorting device equipped with pusher arms attached to the trays, wherein the drive system is placed laterally relative to and at one side of the intermediate space extending between the first and second guide.

SUMMARY OF THE INVENTION

In one embodiment, at a side facing away from the drive system, each tray is coupled to a consecutive tray by means of a stabilising element that hinges relative to the tray and the consecutive tray, which stabilising element is arranged substantially directly opposite the second driving element. In that way the motion properties of the trays during conveyance can be improved because slanting, jolting and trembling of the trays relative to the frame is substantially prevented or at least limited by the stabilising elements.

In one embodiment the stabilising element is coupled to the tray via a first hinge and is coupled to the consecutive tray via a second hinge, such that the centre lines of the first and second hinge extend substantially transverse to the conveyance direction and run substantially parallel to the positioning surface of the tray. In that way a trembling motion of the trays is suppressed, for instance as soon as a tray leaves the first track and as it were drops into the bend, wherein the mass centre of the tray is not situated exactly in the centre between the first and second guide of the path. In that way the pusher mechanism can be situated at the end of the first track, either at the side of the first guide or at the side of the second guide. The trembling of the trays may then particularly occur after for instance a tray leaves the first track with a pusher arm near the first guide, after which a consecutive tray leaves the first track with a pusher arm near the second guide. By directing the first and second hinge substantially transverse to the conveyance direction and substantially parallel to the positioning surface of the tray, a trembling motion of the trays leaving the first track can be prevented or at least be suppressed.

In one embodiment, the centre line of the first hinge of the stabilising element substantially coincides with the centre line of a hinge pin of a first driving element relative to a second driving element, and the centre line of the second hinge of the stabilising element substantially coincides with the centre line of a hinge pin of a first driving element relative to a second driving element. In that way the stabilising element moves substantially synchronously relative to the second driving element, thus achieving a smooth passage of the trays.

In one embodiment the stabilising element is elongated for at least bridging the distance between the first hinge and the second hinge. In that way it is possible to use an easy-to-build stabilising element for preventing or at least suppressing the slanting, jolting and trembling of the trays.

In one embodiment, the stabilising element forms a strip, bar or rod made out of metal, for receiving tensile forces, pressure forces and bending moments arising during a dynamic load. In that way it is possible to use a simple and effective embodiment of the stabilising element.

In one embodiment, considered in a cross-section transverse to the conveyance direction, the first guide, the second guide and the drive system are arranged at substantially the same level relative to the frame. In that way it becomes possible that in the first track, a positioning surface of the tray suitable for an object to be conveyed extends substantially above the drive system, so that the sorting device is suitable for pushing away objects positioned on the trays, from the trays in both lateral directions.

In one embodiment, at a side facing the first guide, the tray comprises a first attachment having a first axis oriented substantially transverse to the conveyance direction, on which axis a first roller is bearing mounted which engages the first guide for supporting the tray, and the tray comprises a second attachment having a second axis oriented substantially transverse to the conveyance direction, on which axis a second roller is bearing mounted which engages the first guide for supporting the tray, wherein the first axis is arranged spaced apart from the second axis, and wherein the first driving element at a first end thereof is connected so as to hinge about the first axis and at a second end thereof facing away from the first end is connected so as to hinge about the second axis. In that way parts constituting the drive system can be economised on, such as economising on links linked together in a chain system, which links are disposed between the first axis and the second axis.

In one embodiment the first end of the first driving element and the first roller are arranged on both sides of the first attachment, and the second end of the first driving element and the second roller are arranged on both sides of the second attachment. In that way for instance access to the drive system for maintenance work is improved.

In one embodiment the first roller and the first attachment are arranged on both sides of the first end of the first driving element, and the second roller and the second attachment are arranged on both sides of the second end of first driving element. In that way it become possible to arrange the drive system further underneath the trays thus further minimising the size of the sorting machine considered in horizontal direction.

DRAWINGS

The invention will now be described in more detail on the basis of an embodiment referring to the figures, in which.

DETAILED DESCRIPTION

Figure 1:
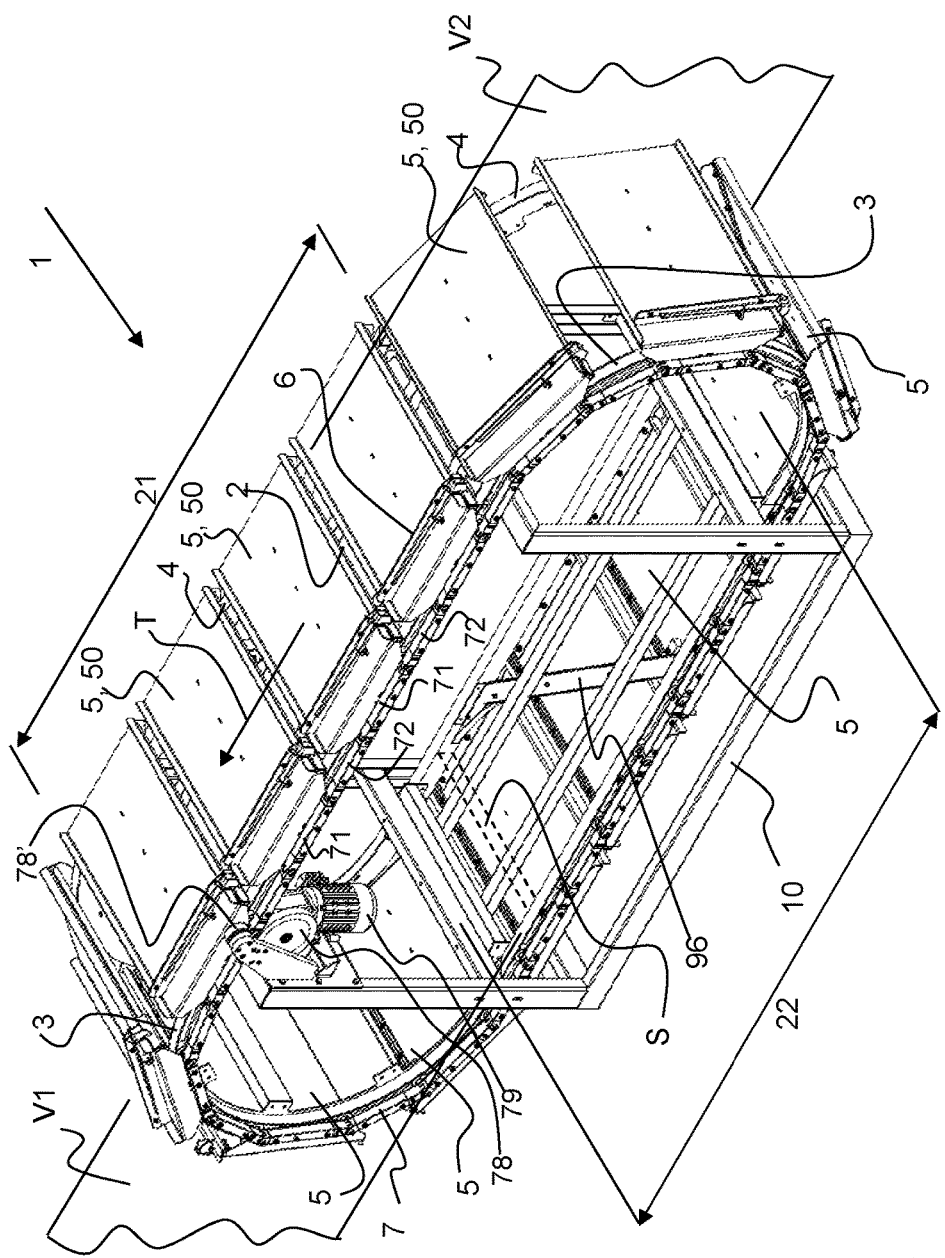
FIG. 1 shows a perspective front view of a sorting device wherein several trays can be conveyed over a path and are coupled to a drive system.

In all figures similar reference numbers indicate similar parts. FIG. 1 shows a sorting device 1 according to the invention. The sorting device is assembled on a chassis or a frame 10, on which an endless path 2 has been formed. The path 2 is intended to be traversed by several trays 5 each having a positioning surface 50 on which an object to be conveyed and sorted can be placed.

The objects to be conveyed and sorted are not shown in the figures. An object to be sorted may be a cardboard or plastic box or a container, goods wrapped in plastic foil, such as clothing, such as goods made of paper, for example magazines, but also individual, unwrapped objects such as shoes. It will be advantageous in such cases to manufacture the trays with a linear measure of at least 200 mm, preferably up to 600 mm, extending parallel to the conveyance direction, and with a breadth of at least 300 mm, preferably up to for instance 800 mm, extending transverse to the conveyance direction. The object that can be conveyed and sorted using the sorting device 1 according to the invention usually roughly weighs between 0.1 kg and 50 kg.

FIG. 1 shows a first and second endless guide 3, 4, arranged on the frame 10, wherein the second guide 4 extends substantially parallel to and spaced apart from the first guide 3. The first guide 3 extends in a first substantially vertical plane V1 and the second guide 4 extends in a second substantially vertical plane V2. The path 2 has a first and a second track 21, 22, in which the trays 5 can be conveyed substantially horizontally, wherein the second track 22 extends substantially underneath the first track 21. From a point indicated by reference number 1 in FIG. 1, a rear view transverse to the sorting device 1 is possible, which rear view is considered from a vertical plane that is substantially parallel to the first and second vertical plane V1, V2, wherein in this rear view the endless guides 3, 4 substantially coincide.

FIG. 1 shows several trays 5 forming a series of trays 5, wherein each tray 5 is arranged so as to be movable in a conveyance direction T via the first and second guide 3, 4 along the path 2. The trays 5 are provided with rollers 31, 32 and 310, 320 shown in FIG. 3 or wheels with which each tray 5 supports on the first and second guide 3, 4, respectively, and during operation follows the direction of the first and second guide 3, 4, respectively.

In FIG. 1 a notional, local rectangular cross-section can be seen in the second track 22, which cross-section defines an intermediate space S extending laterally between the sides of the first and second guide 3, 4, facing each other, and which is limited upwards and downwards by an uppermost and lowermost part, respectively, of the first and second guide 3, 4 in said cross-section. The intermediate space S extends along the entire endless path 2 formed by the first and second guide 3, 4.

As soon as during operation a tray 5 has arrived at the end of the first track 21, the tray 5 is guided towards the second track 22 by a downward bend formed in the first and second guide 3, 4. In the second track 22 the directional vector of the conveyance direction of the trays 5 is opposite the one of the conveyance direction T of the trays 5 in the first track 21. This text refers to the conveyance direction T in general, meaning the directional vector as applicable in the first track 21 and indicated by arrow T.

As soon as during operation a tray 5 has arrived at the end of the second track 22, the tray 5 is guided towards the first track 21 by an upward bend formed in the first and second guide 3, 4.

For driving the series of trays 5, a drive system 7 has been arranged on the frame 10. The drive system 7 forms a closed loop built up out of first and second driving elements 71, 72, the loop extending substantially parallel to and spaced apart from the path 2. As such the drive system 7 extends in a third substantially vertical plane V3, and the drive system 7 has a first horizontal track that is substantially equally long as the first track 21 and the drive system 7 has a second horizontal track that is substantially equally long as the second track 22, wherein the second substantially equally long horizontal track is situated underneath the first substantially equally long horizontal track.

The loop is assembled from alternately arranged first and second driving elements 71, 72 that are mutually connected to each other so as to hinge, for a movement of the drive system that is directed substantially parallel to the conveyance direction T, wherein the drive system 7, considered in a cross-section transverse to the conveyance direction, is arranged substantially adjacent to the path 2, or wherein the drive system 7 is placed laterally relative to and on one side of the intermediate space S extending between the first and second guide 3, 4.

The driving elements 71, 72 are elongated and have a substantially rectangular cross-section. In this example the driving elements have a substantially square cross-section. To enable a movement of the drive system 7 wherein the trays 5 move in an endless loop along the path 2, each first driving element 71 is coupled to a second driving element 72 so as to hinge to such an extent that the centre line 70 of a joint hinge pin of the first and the second driving element 71, 72 extends substantially transverse to the conveyance direction T and runs substantially parallel to the positioning surface 50 of the tray 5.

Figure 3:
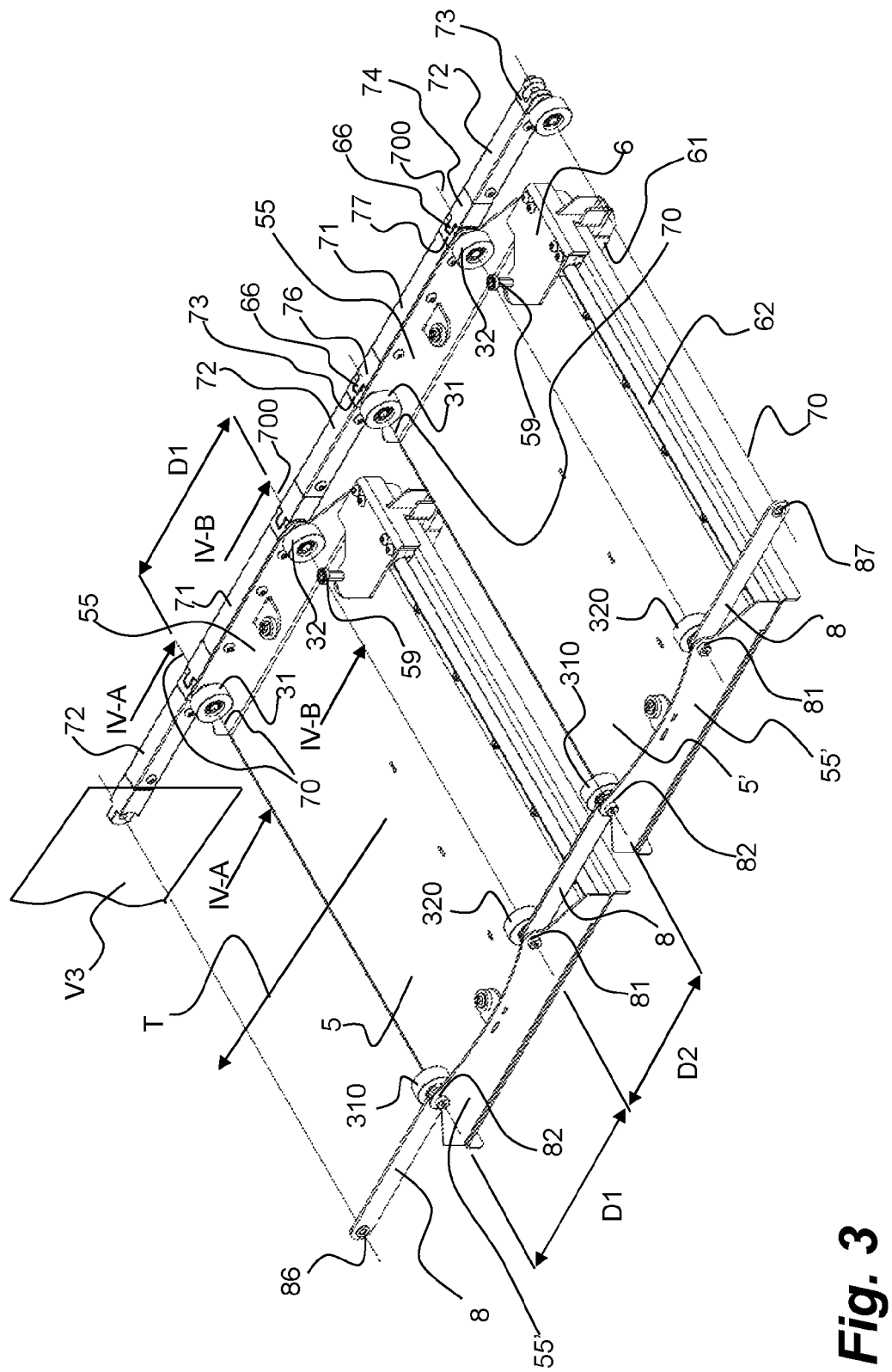
FIG. 3 shows a perspective bottom view of a tray and a consecutive tray of the sorting device according to FIGS. 1 and 2.
Figure 4A:
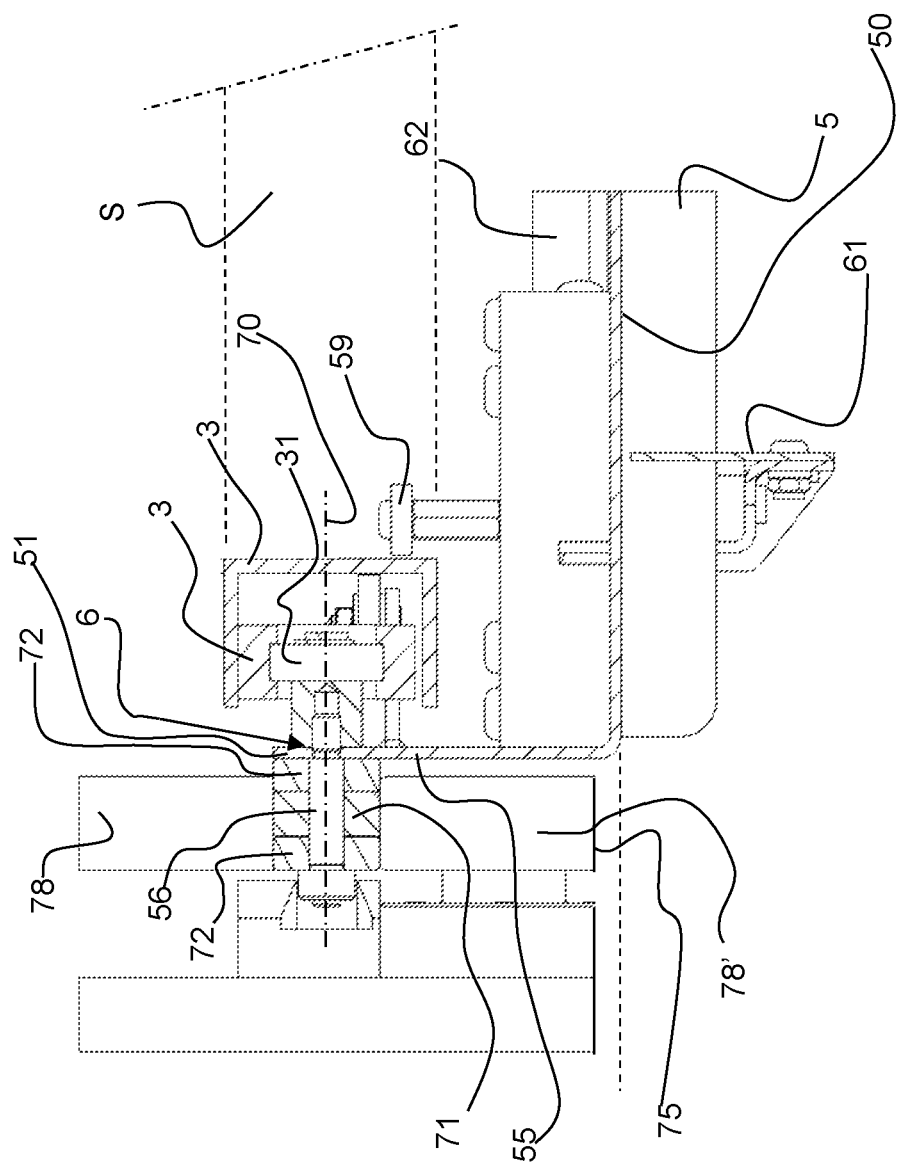
FIG. 4A shows a cross-section according to the line IV-A-IV-A in FIG. 3, with a detail of a first attachment of the tray to a first driving element that is part of the drive system.
Figure 4B:
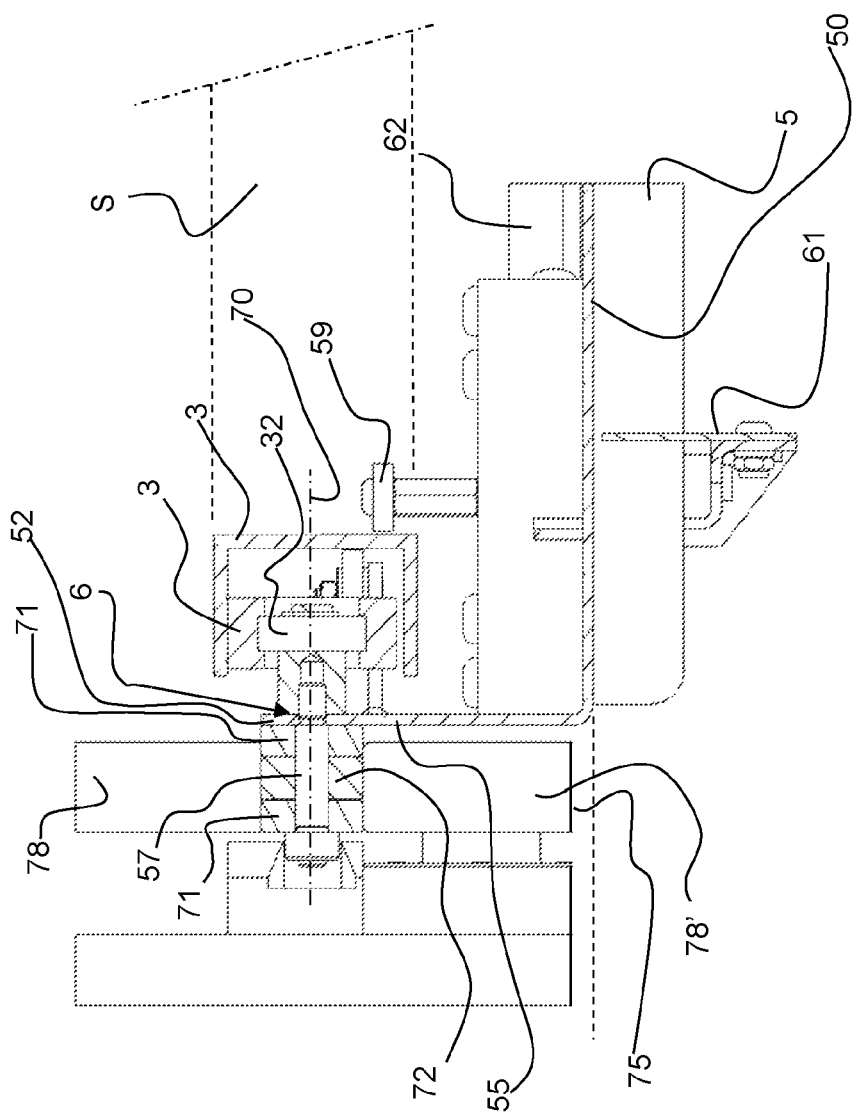
FIG. 4B shows a cross-section according to the line IV-B-IV-B in FIG. 3, with a detail of a second attachment of the tray to the first driving element that is part of the drive system.

While referring to FIGS. 3, 4A and 4B the first driving element 71 at a first end 76 thereof is connected so as to hinge about the centre line 70 of a first axis 56 and the first driving element 71 at a second end 77 thereof facing away from the first end 76 is connected so as to hinge about the centre line 700 of a second axis 57. In addition the first end 76 of the first driving element 71 is formed such that a part thereof engaging onto the first axis 56 has a narrowing 66, wherein, within the rectangular cross-section of the driving elements 71, 72 on either side of the narrowing, there is room for a third end 73 of the second driving element 72 oriented towards the first end 76, which third end 73 is forked for engaging onto the first axis 56 on either side of the narrowing 66. And to achieve a continuous drive system 7 the second end 77 of the first driving element 71 is forked to form an inner space in which a narrowing 66 of a fourth end 74 of the second driving element 72 oriented towards the second end 77 extends to engage onto the second axis 57.

In the vertical plane V3, the drive system 7 thus forms an endless loop which, considered in the rear view transverse to the sorting device 1, has a substantially similar shape as the endless first and/or the second guide 3, 4 and in this example substantially coincides therewith.

To set the drive system 7 into motion and/or keep it in motion, a drive 79 has been arranged on the frame 10, which drive is adapted for transferring a drive power onto the drive system 7, which power is directed substantially parallel to the conveyance direction T. In this example the drive 79 is an electro motor having a drive wheel 78 which in this example engages a part of the drive system 7 that is situated in or near the first track 21.

The drive 79 is placed such on the frame 10 that the drive wheel 78 engages the part of the drive system 7 where, during operation, the trays 5 almost move into the downward bend. As a result the drive 79 exerts a pulling motion on the first horizontal track that is substantially equally long as the first track 21. As long as the length of the first track is shorter than 10 to 25 metres, a single drive 79 for exerting the pulling motion of the drive system 7 will suffice. In case of longer tracks a proportional number of drives can be placed on the frame such that sufficient distance is kept from one drive to the next, such as a distance of for instance between 10 and 25 metres.

In order to be able to generate sufficient traction on the drive system 7, and in order not to allow the part of the drive system 7 situated in or near the first track 21 to bend out upwards, a counter wheel 78' has been arranged on the frame 10, such that this wheel 78' prevents or at least impedes any upward bending. In this position of the drive 79 the drive wheel 78 engages a downwardly oriented plane of the driving elements 71, 72 with a pre-tension.

In order to set the trays 5 into motion and/or keep them in motion, the trays 5 are connected to the drive system 7 such that each tray 5 is coupled to one of the first driving elements 71, and such that per first driving element 71 at most one tray 5 is coupled. When exerting the drive power onto the drive system 7 by means of traction, the trays 5 follow the motion of the drive system 7, and in particular the motion of the first driving elements 71, wherein the trays 5 are guided by the first and second guide 3, 4 while traversing the path 2.

At a side of the tray 5 facing the first guide 3, the tray 5 is coupled to the first driving element 71 via the first attachment 51 and the first axis 56 shown in FIG. 4, and wherein the tray 5 is provided with a bent plate section 55 on which the first axis 56 is attached substantially transverse to the plate section 55. Moreover, at the side of the tray 5 facing the first guide 3, the tray 5 is coupled to the first driving element 71 via the second attachment 52 and the second axis 57 shown in FIG. 4B, wherein the tray 5 is provided with a bent plate section 55 on which the second axis 57 is attached substantially transverse to the plate section 55.

Both the first and second axis 56, 57 have a centre line referred to in the figures by reference numbers 70 and 700, respectively, and which centre lines 70, 700 are oriented substantially transverse to the conveyance direction T and which run substantially parallel to the positioning surface 50 of the tray 5. A first roller 31 is bearing mounted on the first axis 56 to engage onto the first guide 3 for supporting the tray 5, and on the first axis 56 the first and second driving elements 71, 72 have been arranged such that the first roller 31 and the drive system 7 are situated on either side of the plate section 55. And a second roller 32 is bearing mounted on the second axis 57, which roller engages the first guide 3 for supporting the tray 5, and on the second axis 57 the first and second driving elements 71, 72 have been arranged such that the second roller 32 and the drive system 7 are situated on either side of the plate section 55. The first and second axis 56, 57 are placed at a distance D1 from each other as shown in FIG. 3.

At a side of the tray 5 facing the second guide 4, the tray 5 is provided with a bent plate section 55' on which further axes and/or rollers 310, 320 are attached substantially transverse to the plate section 55', for supporting the tray 5 and for guiding the tray 5 along the second guide 4. These axes, indicated as hinges 81, 82 in FIG. 3, each have centre lines 70, 700 that substantially coincide with the centre lines 70, 700 of the first and second axes 56, 57, respectively, and are arranged at a mutual distance D1 on the plate section 55' of the tray 5 as shown in FIG. 3. Due to this position it is achieved that relative to the first and second guide 3, 4, the tray 5 is supported in a substantially symmetrical way and can be guided.

The sorting device 1 described above is used for conveying an object positioned on the positioning surface 50 of the tray 5 over at least a part of the first track 21, wherein, during operation, the object is pushed laterally from the tray 5 at a predetermined point in time to a target position P, that is not shown, located adjacent to the sorting device 1, the target position P for instance being a container or platform for collecting at least the object.

For pushing away an object substantially transverse to the conveyance direction T, the tray 5 is provided with a pusher mechanism 6. The pusher mechanism 6 comprises a pusher arm 61 that is situated above the positioning surface 50 of the tray 5 and can be guided transverse to the conveyance direction T by means of a pusher guide 62 arranged below the tray 5. The pusher guide 62 is arranged near an edge of the tray 5 situated downstream relative to the conveyance direction T.

In this example the pusher arm 61 is situated near the first guide 3 in a first position. The pusher arm 61 is in a first position when the tray 5 is situated in a first part of the first track 21, during the conveying movement T.

The pusher arm 61 is movable along the pusher guide 62, from the first position to the second position, in which second position the pusher arm 61 is situated once an object positioned on the tray 5 has been pushed from the tray.

Figure 2:
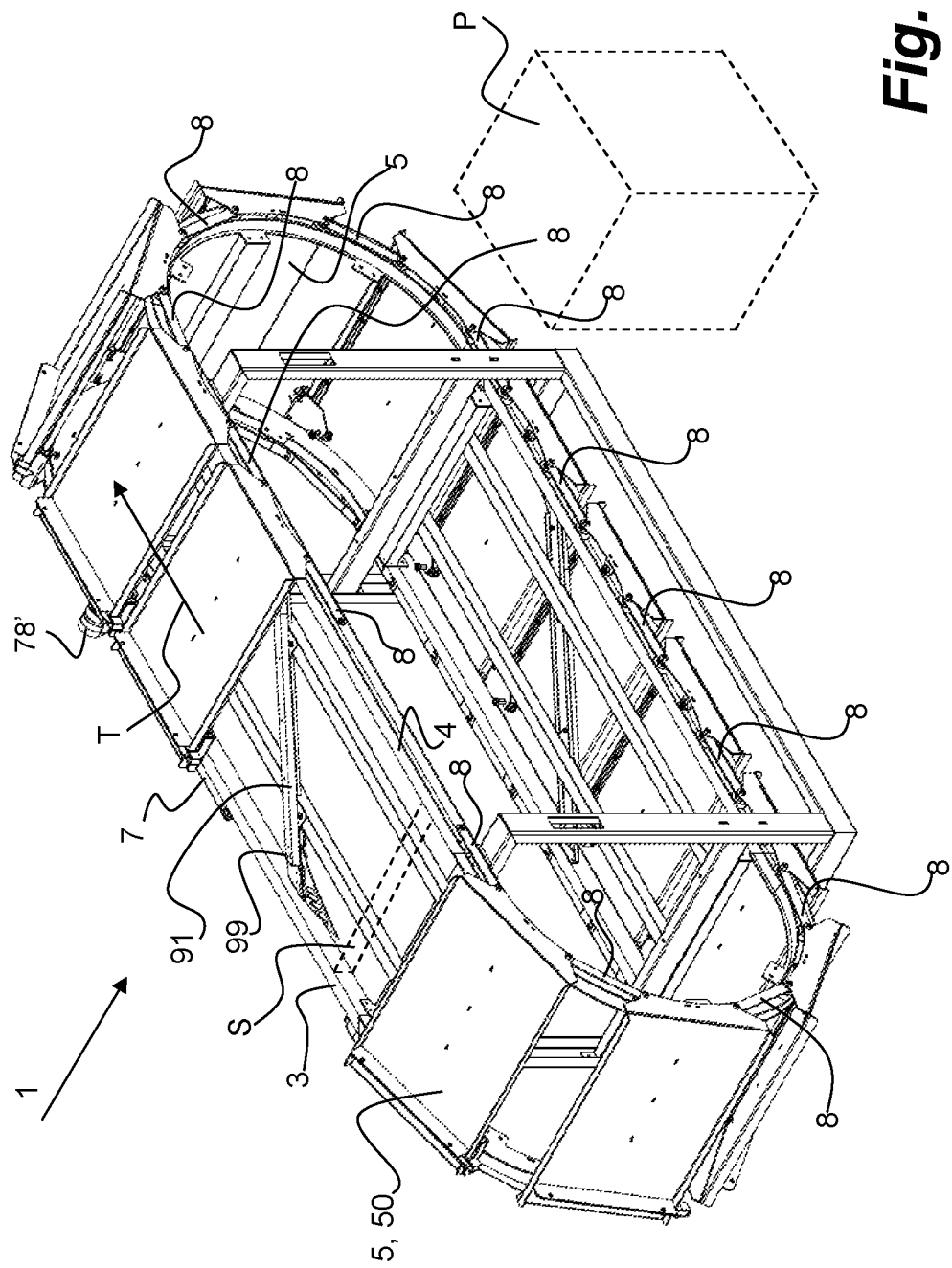
FIG. 2 shows a perspective rear view of the sorting device according to FIG. 1, wherein several trays can be conveyed over the path and are mutually coupled to each other by means of stabilising elements.

For moving the pusher arm 61 from the first position to the second position an exchange system 9 has been arranged on the frame 10. In FIG. 2, a first exchange element 91 has been arranged between the first and the second guide 3, 4 in the first track 21, which element considered from above, relative to the conveyance direction T, is arranged diagonally from the first guide 3 to the second guide 4, along which an engagement member 59 can be guided, which engagement member 59 is attached at a side facing away from the positioning surface 50, in this case the bottom side, of the tray 5, wherein transverse to the conveyance direction T, the pusher arm 61 moves along towards the second position.

At a side of the first exchange element 91 oriented towards the first guide 3, several operation members 99 have been arranged on the frame 10, which members have a protruding part that, when operated, ends up in the path 2 of the engagement member 59 of the tray 5, wherein the operation member 99 sets the pusher mechanism 6 in motion, wherein the pusher arm 61 is guided from the first position to the second position.

In order to sort an object on a target position P shown in FIG. 2, the sorting device 1 is provided with a control system that is not shown and which determines which operation member 99 needs to be operated at what moment in order to push the object from the tray 5 in time.

After pushing an object from the tray 5, the pusher arm 61 is in the second position and it remains in this position until the engagement member 59 of the tray 5 collides with a second exchange element 96 placed in the second track 22. Considered from above, relative to the movement direction of the trays 5 in the second track 22, the second exchange element 96 is arranged diagonally from the second guide 4 towards the first guide 3, along which second exchange element 96 the engagement member 59 of the tray 5 attached to a side the tray 5 facing away from the positioning surface 50, can be guided for a returning motion of the pusher arm towards the first position.

As soon as a tray 5 has arrived at the end of the first track 21, the tray 5 is guided towards the second track 22 by a downward bend formed in the first and second guide 3, 4. When the pusher arm 61 is in the first position, the mass centre of such a tray is situated more in the direction of the first guide 3, and when the pusher arm 61 is in the second position, the mass centre of such a tray is situated more in the direction of the second guide 4. When a tray 5 with the pusher arm 61 in the first position moves through the downward bend, and a consecutive tray 5' with the pusher arm 61' in the second position moves through the downward bend, a wiggly, jolting or trembling motion of the trays 5, 5' relative to the frame 10 may arise during operation under the influence of the difference in position of the mass centres of the consecutive trays 5, 5'. Under the influence of the operating drive system 7 arranged lateral from the intermediate space S, a trembling passage of the trays 5, 5' may also occur. To improve the travelling characteristics of the trays 5, 5' the consecutive trays 5, 5', at a side of the trays 5, 5' facing away from the drive system 7, are mutually coupled to each other by means of a stabilising element 8. In addition the stabilising element 8 is arranged substantially perpendicular opposite the second driving element 72.

The stabilising element 8 is elongated and a rigid structural member, in this example formed by a flat structural member, such as a strip. The stabilising element 8 preferably is manufactured of metal such as substantially all essential parts of the sorting device 1. Alternatively the stabilising element 8 may be manufactured of a synthetic material, as long as the material is suitable for receiving tensile and pressure forces, and in case of highly slanting motion of the trays also receiving bending moments.

The stabilising element 8 comprises a first engagement means 86, such as a through-opening, in order to engage onto an axis section of the first hinge 81 of the tray 5 for a hinging motion about the centre line 700. The stabilising element 8 comprises a second engagement means 87, such as a through-opening, in order to engage onto an axis section of the second hinge 82 of a consecutive tray 5' for a hinging motion about the centre line 70.

The stabilising element 8 is coupled to the tray 5 via a first hinge 81 and is coupled to the consecutive tray 5' via a second hinge 82, such that the centre lines of the first and second hinge 81, 82 of the stabilising element 8 extend substantially transverse to the conveyance direction T and run substantially parallel to the positioning surface 50 of the tray 5. The centre line of the first hinge 81 of the stabilising element 8 substantially coincides with the centre line 700 of the second axis 57 which is attached to the tray 5 via the second attachment 52. The centre line of the second hinge 82 of the stabilising element 8 substantially coincides with the centre line 70 of the first axis 56 which is attached to the tray 5' via the first attachment 51.

The distance D2 between the centre line 700 through the first engagement means 86 and centre line 70 through the second engagement means 87 substantially equals the distance between the centre line 700 of the roller 32 of the tray 5 and the centre line 70 of the roller 31 of the consecutive tray 5'. In this way each stabilising element 8 is arranged substantially transverse opposite the second driving element 72, as a result of which the trays 5, 5' are guided in a substantially symmetrical way and/or corrected, during the movement relative to the first and second guide 3, 4.

FIGS. 4A and 4B show that the positioning surface 50 of the tray 5 extends beyond the ultimate height 75 of the counter wheel 78' of the drive 79. For that purpose, considered in a cross-section transverse to the conveyance direction, the first guide 3, the second guide 4 and the drive system 7 are arranged at substantially the same level relative to the frame 10. In this way it is possible that the positioning surface 50 of the tray 5 extends in the first track 21 above/over the drive 79, 78', as a result of which it becomes possible to push objects positioned on the positioning surface 50 laterally away also near a side of the tray facing the first guide 3.

Naturally the invention is not limited to the preferred embodiment described and shown, but it extends to any embodiment within the spirit and scope of protection as defined in the claims and considered in view of the above description and the related drawings. For instance rectangular trays may be preferred in actual practice, yet an expert will understand that within the invention this shape may be deviated from to a certain extent.

The invention claimed is:

1. A sorting device comprising:
    a frame,
    an endless path formed by a first and second endless guide arranged on the frame, wherein the second guide is placed substantially parallel to and spaced apart from the first guide,
    a series of trays each having a positioning surface for carrying an object to be conveyed and sorted, wherein each tray is arranged so as to be movable in a conveyance direction via the first and second guide along the path, wherein the trays are provided with a pusher mechanism for pushing away an object substantially transverse to the conveyance direction, wherein the pusher mechanism is operable via an engagement member attached to the tray,
    an exchange system arranged on the frame, which exchange system comprises an operation member that when operated engages the engagement member attached to the tray for driving the pusher mechanism,
    a drive system which substantially parallel to and spaced apart from the path forms a closed loop assembled from alternately arranged first and second driving elements, that are mutually hinged to each other for a movement of the drive system that is directed substantially parallel to the conveyance direction, wherein the drive system is placed laterally relative to and on one side of the intermediate space extending between the first and second guide,
    a drive adapted for transferring a drive power onto the drive system, which power is directed substantially parallel to the conveyance direction,
    wherein the trays are connected to the drive system, such that each tray is coupled to one of the first driving elements,
    wherein the first guide extends in a first substantially vertical plane and the second guide extends in a second substantially vertical plane, such that the path has a first track in which the trays can be conveyed substantially horizontally for conveying an object, and the path has a second track that extends substantially underneath the first track, and
    wherein each first driving element is coupled so as to hinge with a second driving element to such an extent that the centre line of a joint hinge pin of the first and the second driving element extends substantially transverse to the conveyance direction and runs substantially parallel to the positioning surface of the tray,
    wherein each tray at a side facing away from the drive system is coupled to a consecutive tray by means of a stabilising element that hinges relative to the tray and the consecutive tray, which stabilising element is arranged substantially directly opposite the second driving element,
    wherein the stabilising element is coupled to the tray via a first hinge and is coupled to the consecutive tray via a second hinge, such that the center lines of the first and second hinge extend substantially transverse to the conveyance direction and run substantially parallel to the positioning surface of the tray.

2. The sorting device according to claim 1, wherein the centre line of the first hinge of the stabilising element substantially coincides with the centre line of a hinge pin of a first driving element relative to a second driving element, and wherein the centre line of the second hinge of the stabilising element substantially coincides with the centre line of a hinge pin of a first driving element relative to a second driving element.

3. The sorting device according to claim 1, wherein the stabilising element is elongated for at least bridging the distance between the first hinge and the second hinge.

4. The sorting device according to claim 1, wherein the stabilising element for receiving tensile forces, pressure forces and bending moments arising during a dynamic load, forms a strip, bar or rod made out of metal.

5. The sorting device according to claim 1, wherein considered in a cross-section transverse to the conveyance direction, the first guide, the second guide and the drive system are arranged at substantially the same level relative to the frame.

6. The sorting device according to claim 1, wherein the tray at a side facing the first guide comprises a first attachment having a first axis oriented substantially transverse to the conveyance direction on which axis a first roller is bearing mounted which engages the first guide for supporting the tray, and comprises a second attachment having a second axis oriented substantially transverse to the conveyance direction on which axis a second roller is bearing mounted which engages the first guide for supporting the tray, wherein the first axis is arranged spaced apart from the second axis, and wherein the first driving element at a first end thereof is connected so as to hinge about the first axis and at a second end thereof facing away from the first end is connected so as to hinge about the second axis.

7. The sorting device according to claim 6, wherein the first end of the first driving element and the first roller are arranged on both sides of the first attachment, and wherein the second end of the first driving element and the second roller are arranged on both sides of the second attachment.

8. The sorting device according to claim 6, wherein the first roller and the first attachment are arranged on both sides of the first end of the first driving element, and wherein the second roller and the second attachment are arranged on both sides of the second end of first driving element.

\* \* \* \* \*